Cross Reference EXAMINERS ROOM
299
John Gore.
Harvester Cutter.
No. 277
Patented April 10 1860.
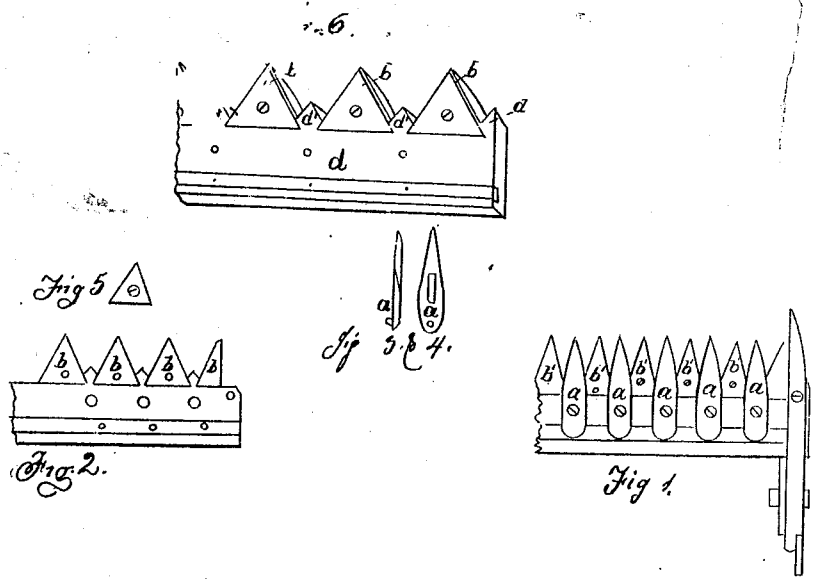
Witnesses
J. G. Clayton
Chas. R. Burch
John Gore